(12) United States Patent
Zhang

(10) Patent No.: US 8,094,279 B2
(45) Date of Patent: Jan. 10, 2012

(54) DISPLAY SCREEN

(75) Inventor: Tao Zhang, Shenzhen (CN)

(73) Assignees: ShenZhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 159 days.

(21) Appl. No.: 12/758,112

(22) Filed: Apr. 12, 2010

(65) Prior Publication Data

US 2011/0149222 A1 Jun. 23, 2011

(30) Foreign Application Priority Data

Dec. 17, 2009 (CN) .......................... 2009 1 0311703

(51) Int. Cl.
*G02F 1/1335* (2006.01)
*G02B 27/00* (2006.01)

(52) U.S. Cl. ............. 349/137; 349/57; 349/56; 359/609

(58) Field of Classification Search .................... 349/57, 349/56, 64, 67, 112, 113, 119, 137; 359/609
See application file for complete search history.

(56) References Cited

U.S. PATENT DOCUMENTS

| 5,042,912 | A * | 8/1991 | Sato et al. ..................... 359/638 |
| 6,101,041 | A * | 8/2000 | Ishibashi et al. .............. 359/634 |
| 6,238,051 | B1 * | 5/2001 | Huang ............................ 353/81 |
| 6,909,080 | B2 * | 6/2005 | Patel et al. .................. 250/208.1 |
| 7,498,560 | B2 * | 3/2009 | Hwang et al. ................. 250/221 |
| 2005/0104253 | A1 * | 5/2005 | Katsumoto et al. ........... 264/284 |
| 2009/0269550 | A1 * | 10/2009 | Kuo Hsu ....................... 428/143 |
| 2011/0149222 | A1 * | 6/2011 | Zhang ........................... 349/137 |

* cited by examiner

*Primary Examiner* — Brian Healy
(74) *Attorney, Agent, or Firm* — Altis Law Group, Inc.

(57) ABSTRACT

An exemplary display screen includes a display module and an anti-reflective module at one side thereof. The anti-reflective module includes a plurality of refraction structures connected in sequence. Each refraction structure includes a connection section and a plurality of refraction sections. The refraction sections are connected to both sides of the connection section and form an included angle with the connection section to form indented anti-reflection structures.

20 Claims, 5 Drawing Sheets

DISPLAY SCREEN

BACKGROUND

1. Technical Field

The disclosure generally relates to display screens, more particularly, to a display screen used in a portable electronic device.

2. Description of the Related Art

Liquid crystal displays (LCDs) and other flat panel displays are widely used in mobile phones, personal digital assistants (PDAs) and other portable electronic devices. As the man-machine communication interface, the display screens are indispensable in providing necessary information.

However, in practical use, when used in bright environments such as sunlight, the display screens of the portable electronic devices may experience reflection, making it difficult to view content.

Therefore, there is room for improvement within the art.

BRIEF DESCRIPTION OF THE DRAWINGS

Many aspects of a display screen can be better understood with reference to the following drawings. The components in the drawings are not necessarily drawn to scale, the emphasis instead being placed upon clearly illustrating the principles of the exemplary display screen. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
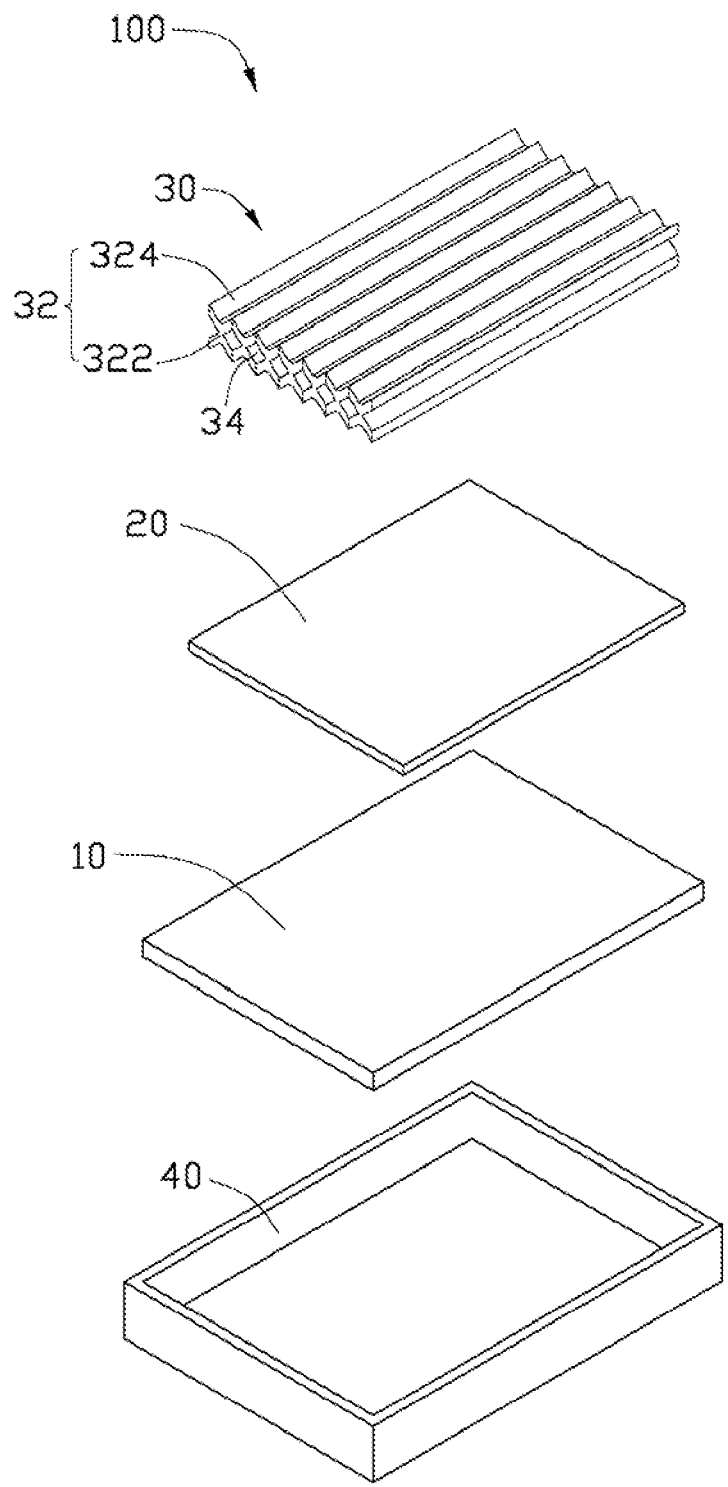
FIG. 1 is an exploded view of a display screen, according to an exemplary embodiment.
Figure 2:
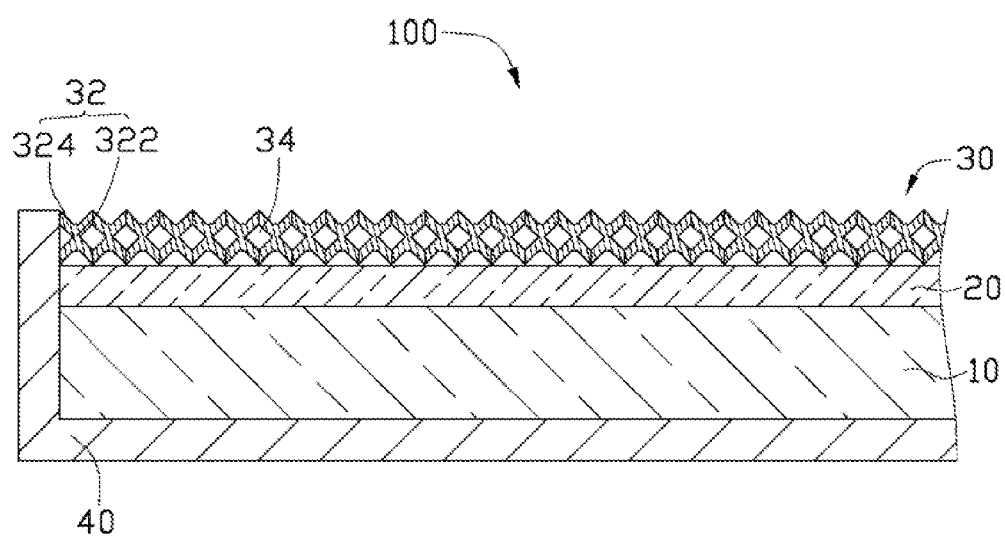
FIG. 2 is a cross-section of the display screen of FIG. 1 after assembly.

FIGS. 1 and 2 show an exemplary embodiment of a display screen 100 used in a portable electronic device, such as a mobile phone, a PDA, or other device. The display screen 100 includes a backlight module 10, a display module 20, an anti-reflective module 30, and a housing 40. The backlight module 10, the display module 20, and the anti-reflective module 30 are sequentially assembled, and positioned in the housing 40.

The backlight module 10 is connected to the interior surface of the housing 40, and the display module 20 is connected to the top of the backlight module 10. The anti-reflective module 30 is connected to the top of the display module 20 and partially exposed from the housing 40. The backlight module 10 provides adequate and uniform light for the display module 20 to properly display image information, such as graphics and/or text. The display module 20 can be an existing liquid crystal display (LCD) panel.

The anti-reflective module 30 is a transparent sheet and can be made of polymethyl methacrylate (PMMA) or other transparent material. The anti-reflective module 30 is fixed on the surface of the display module 20 to prevent or reduce reflections and includes a plurality of refraction structures 32.

Figure 3:
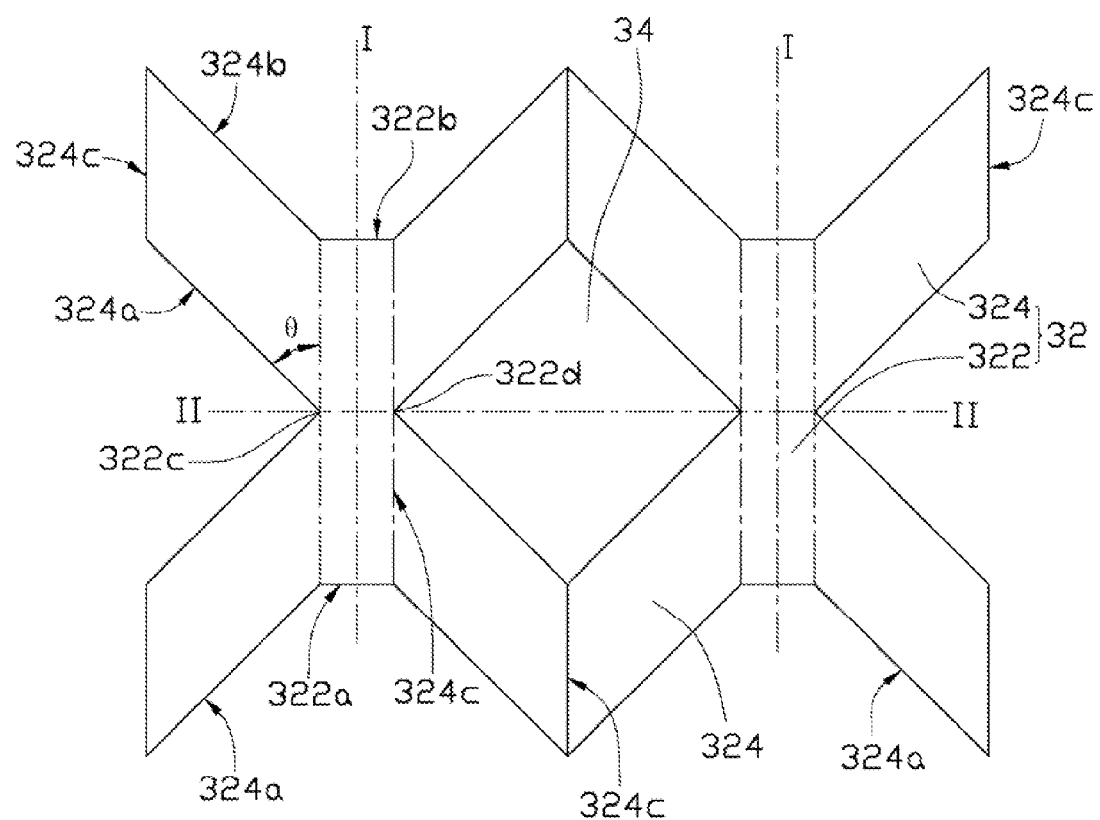
FIG. 3 is an enlarged view of refraction structures of the display screen of FIG. 1.

Also referring to FIG. 3, each refraction structure 32 includes a connection section 322 and four refraction sections 324. The refraction sections 324 are connected to the connection section 322, and every two refraction sections 324 are connected to one side of the connection section 322. The connection section 322 is a rectangular sheet and includes an incident surface 322a, a refracting surface 322b, a first connecting surface 322c, and a second connecting surface 322d. The incident surfaces 322a and the refracting surfaces 322b are parallel with each other and form two ends of the connection sections 322. Among them, the incident surfaces 322a face the display module 20. The first connecting surfaces 322c and the second connecting surfaces 322d are parallel and form other two ends of the connection sections 322, perpendicular to the incident surfaces 322a.

Two refraction sections 324 are connected to the first connecting surface 322c, and two are correspondingly connected to the second connecting surface 322d. The broken line I shows a central axis of the connection sections 322. The broken line II shows a central axis of the connection sections 322 perpendicular to the first connecting surface 322c. Thus, any two refraction sections 324 are symmetrical about either central axis I or central axis II, such that refraction structure 32 is essentially X-shaped in cross section.

Each refraction section 324 has a straight quadrangular prism shape, with a parallelogram cross-section. Each refraction section 324 includes a first refractive surface 324a, a second refractive surface 324b, and two parallel connection surfaces 324c. Among them, one connection surface 324c connects to the first connecting surface 322c or the second connecting surface 322d, so that the refraction sections 324 are connected to the connection sections 322. Another connection surface 324c is connected to the connection surface 324c of another refraction structure 32. In detail, the first refractive surface 324a and the second refractive surface 324b intersect with the first connecting surface 322c or the second connecting surface 322d to form an included angle θ. In this embodiment, the angle θ is about 45°.

The connection surfaces 324c of two refraction sections 324 of one refraction structure 32 are connected to the connection surfaces 324c of two refraction sections 324 of the adjacent refraction structure 32. Thus, the refraction structures 32 are connected side by side; so that the first connecting surfaces 322c of one connection section 322 correspond to the second connecting surfaces 322d of the adjacent connection section 322. In detail, the outer surfaces (the sides of the refracting surfaces 322b and the second refractive surfaces 324b) of the refraction structures 32 form indented anti-reflection structures, and the inner surfaces (the sides adjacent the display module 20) of the refraction structures 32 also form indented anti-reflection structures. Two refraction sections 324 of one of refraction structures 32 are connected to the corresponding two refraction sections 324 of the contiguous refraction structures 32 to form a receiving chamber 34. The receiving chamber 34 may be filled with water, air, or other fluid material. In this embodiment, the receiving chamber 34 is filled with air.

Figure 4:
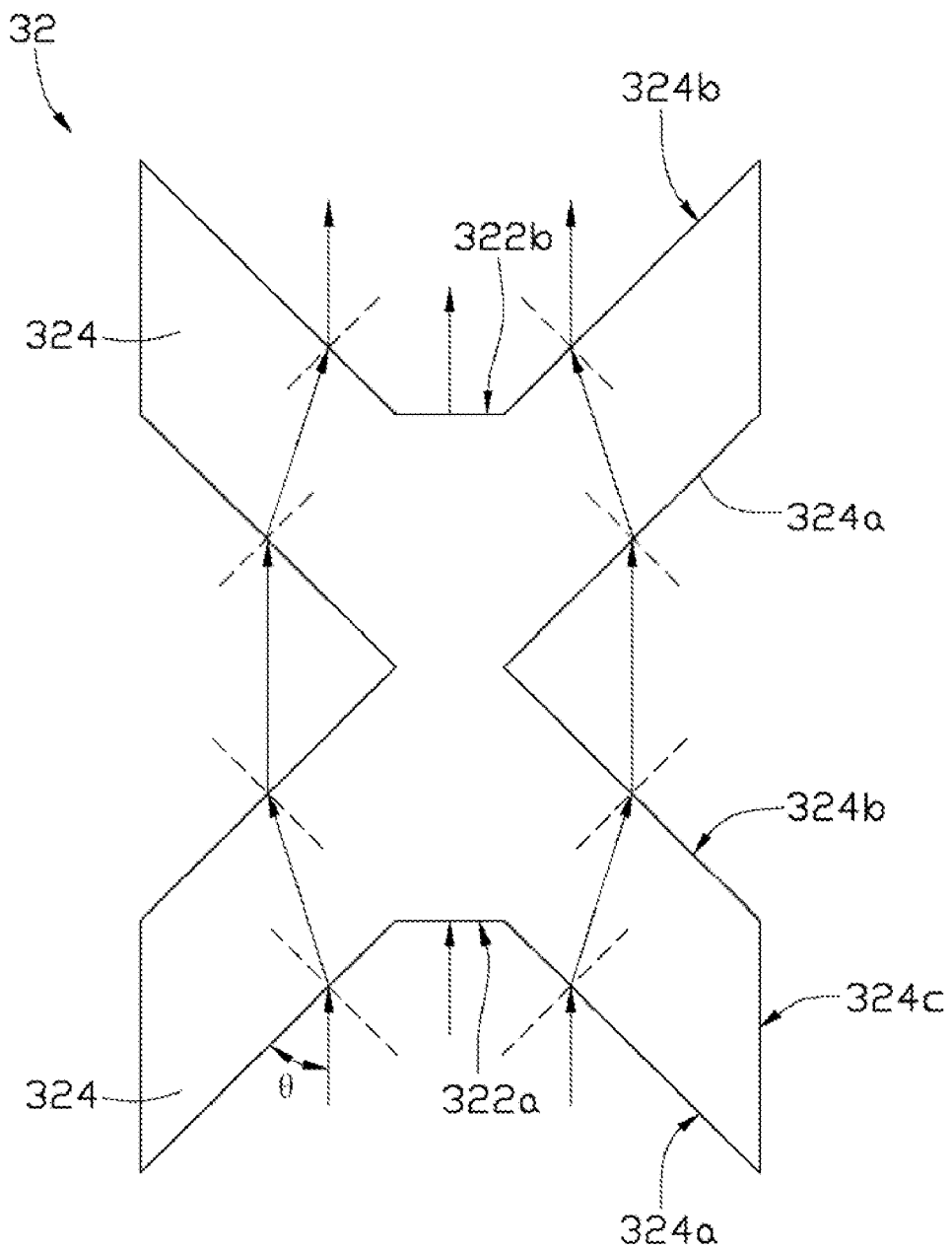
FIG. 4 is a schematic view of a light path through the refraction structures of FIG. 3.

Further referring to FIGS. 3 and 4, in use, the backlight module 10 provides dedicated light for the display module 20 to properly display image information. The light passes through the display module 20 and vertically reaches all incident surfaces 322a of the anti-reflective module 30, at which time a portion of light passes vertically through the incident surface 322a and is vertically emitted from the refracting surface 322b. Another part of the light is incident upon the first refractive surfaces 324a and forms an included angle θ with the first refractive surfaces 324a, the incident angle being the complementary angle of θ.

The light is refracted twice when passing through any one refraction section 324, according to the structural features of the refraction sections 324, finally the light is emitted parallel to the refracting surfaces 322b and perpendicular to the refracting surface 322b. In other words, when light from the backlight module 20 is incident upon the refraction structures 32 of the anti-refractive module 30, the emitted light is parallel to the incident light. Namely, the light from the display module 20 maintains the corresponding propagation direction after refraction by the anti-reflective module 30. Thus, the anti-reflective module 30 is unable to affect the propagation direction of the light from the backlight module 10, nor is it able to negatively affect the display module 20.

Figure 5:
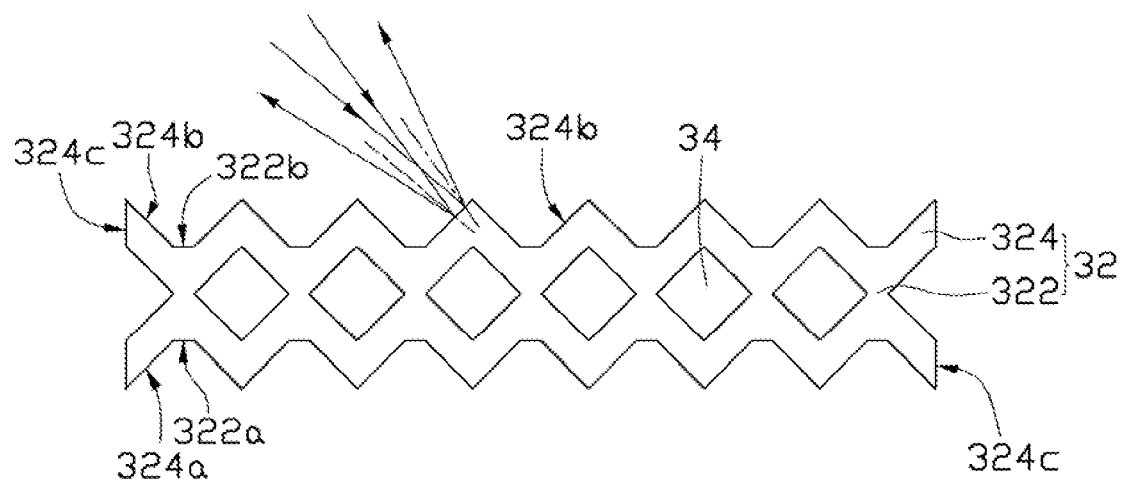
FIG. 5 is a schematic view of a light path through an anti-reflective module of the display screen of FIG. 1.

Also referring to FIG. 5, according to light transmission theory, when external light (e.g., sunlight) from different directions reaches the different refracting surfaces 322b and the second refraction surfaces 324b, the light forms a diffuse reflection on the surface of the anti-reflective module 30 due to the uneven outer surface of the anti-reflective module 30. Therefore, the display screen 100 experiences no reflection and performance of the display module 20 is significantly enhanced.

The incident angle can be adjusted by adjusting the included angle θ, so that as much light as much as possible reaches different refraction sections 324, and passes through anti-reflective module 30.

In the display screen 100 of the exemplary embodiment, the anti-reflective module 30 of the display screen 100 can cause diffuse reflections due to the uneven surface while the external light is incident upon the surface of the anti-reflective module 30 to prevent reflection. Moreover, the anti-reflective module 30 is unable to affect the propagation of the light from the backlight module 10, so that the display module 20 can display image information correctly.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A display screen, comprising:
 a display module for displaying image information; and
 an anti-reflective module located at one side of the display module, the anti-reflective module comprising a plurality of refraction structures connected in sequence, wherein each refraction structure comprises a connection section and a plurality of refraction sections, the refraction sections are connected to both sides of the connection section and form an included angle with the connection section to form indented anti-reflection structures.

2. The display screen as claimed in claim 1, wherein the connection sections are rectangular sheets, and each connection section comprises an incident surface, a refracting surface, a first connecting surface, and a second connecting surface, wherein the incident surface and the refracting surface are parallel, and the first connecting surface and the second connecting surface are parallel.

3. The display screen as claimed in claim 2, wherein the incident surface and the refracting surface form two ends of the connection section, all the incident surfaces face the display module, the first connecting surface and the second connecting surface form other two ends of the connection section perpendicular to the incident surface.

4. The display screen as claimed in claim 3, wherein four refraction sections are deployed, with two on the first connecting surface, and the other two correspondingly on the second connecting surface, and wherein any two refraction sections are symmetrical about a first central axis or a second central axis, perpendicular to the first central axis.

5. The display screen as claimed in claim 2, wherein each refraction section has a straight quadrangular prism shape, with a parallelogram cross-section, and comprises a first refractive surface and a second refractive surface, and the first refractive surface and the second refractive are parallel and form two ends of the refraction section.

6. The display screen as claimed in claim 5, wherein each refraction section further comprises two connection surfaces, the two connection surfaces are parallel and form other two ends of the refraction section.

7. The display screen as claimed in claim 6, wherein one connection surface is connected to the first connecting surface or the second connecting surface, another connection surface is connected to the connection surface of other refraction structure, and the first refractive surface and the second refractive surface interest with the first connecting surface or the second connecting surface forming the included angle.

8. The display screen as claimed in claim 7, wherein the angle is about 45°.

9. The display screen as claimed in claim 1, wherein the anti-reflective module defines a receiving chamber formed between any two contiguous refraction structures.

10. The display screen as claimed in claim 9, wherein the receiving chamber is filled with air.

11. The display screen as claimed in claim 1, further comprising a backlight module providing light for the display module, wherein the display module and the anti-reflective module are connected to the top of the display module.

12. The display screen as claimed in claim 11, further comprising a housing in which the backlight module, the display module and the anti-reflective module are assembled and positioned, and from which the anti-reflective module is partially exposed.

13. The application a display screen comprising: a display module for displaying large information, a backlight module located at one side of the display module, providing light for the display module to display the corresponding information; and an anti-reflection module located at another side of the display module, the anti-reflective module comprising a plurality of refraction structures connected in sequence, wherein each refraction structure comprises a connection section and four refraction sections, every two refraction sections are connected to both sides of the connection section, and the each reflection section intersects with one side of the corresponding connection section to form an included angle to prevent reflections.

14. The display screen as claimed in claim 13, wherein the connection sections are rectangular sheets, and each connection section comprises an incident surface, a refracting surface, a first connecting surface, and a second connecting surface, wherein the incident surface and the refracting surface are parallel, as are the first connecting surface and the second connecting surface.

15. The display screen as claimed in claim 14, wherein the incident surface and the refracting surface form two ends of the connection section, all the incident surfaces face the display module, the first connecting surface and the second connecting surface form other two ends of the connection section, perpendicular to the incident surface.

16. The display screen as claimed in claim 13, wherein two refraction sections are connected to the first connecting surface, another two refraction sections are correspondingly connected to the second connecting surface, and wherein any two refraction sections are symmetrical about a first central axis or a second central axis, perpendicular to the first central axis.

17. The display screen as claimed in claim 14, wherein each refraction section has a straight quadrangular prism shape, with parallelogram cross-section, and comprises a first refractive surface and a second refractive surface, and the first refractive surface and the second refractive are parallel and form two ends of the refraction section.

18. The display screen as claimed in claim 17, wherein each refraction section further comprises two parallel connection surfaces, forming the other two ends of the refraction section.

19. The display screen as claimed in claim 18, wherein one connection surface is connected to the first connecting surface or the second connecting surface, another connection surface is connected to the connection surface of other refraction structure, and the first refractive surface and the second refractive surface interest with the first connecting surface or the second connecting surface forming the included angle.

20. The display screen as claimed in claim 13, further comprising a housing in which the backlight module, the display module and the anti-reflective module are assembled and positioned, and from which the anti-reflective module is partially exposed.

\* \* \* \* \*